United States Patent Office 3,806,488
Patented Apr. 23, 1974

3,806,488
STABILIZED FLAME RESISTANT POLYAMIDES
Herman Stone, Convent Station, and Theodore Largman, Morristown, N.J., assignors to Allied Chemical Corporation, New York, N.Y.
No Drawing. Filed Sept. 14, 1971, Ser. No. 180,495
Int. Cl. C08g 51/60; C09k 3/28
U.S. Cl. 260—37 N      7 Claims

ABSTRACT OF THE DISCLOSURE

Red phosphorus is stabilized by the addition of aminoacetic acids and derivatives thereof. Stabilized red phosphorus is useful as a flame retardant additive for polyamides.

---

This invention relates to the stabilization of red phosphorus. More particularly, this invention relates to the stabilization of red phosphorus by addition of aminoacetic acids and derivatives thereof.

BACKGROUND OF THE INVENTION

It is known that the resistance of red phosphorus to oxidation, either by elemental oxygen or oxidizing agents, is improved when iron and copper impurities are removed. These impurities have been removed by various processes; by boiling the red phosphorus with 8% aqueous sodium cyanide solution; by oxidizing the red phosphorus in air having a high relative humidity for several days followed by washing and drying; or by washing with an acid to remove the iron present, subsequently washing with water to remove the acid and drying. These procedures are tedious and expensive and they have been less than satisfactory on a large scale.

The prior art has also disclosed that red phosphorus which has been purified and which contains less than about 90 p.p.m. of iron, can be stabilized by adding a metal hydroxide, such as aluminum hydroxide, magnesium hydroxide or zinc hydroxide, or an organic compound containing hydroxyl groups, such as erythritol, mannitol, sorbitol, dextrose and the like, to the red phosphorus.

Red phosphorus has recently gained new prominence as a flame retardant additive for various polymers, such as polyepoxides, polyurethanes, and styrene/acrylonitrile polymers. In order to prevent degradation of the polymer at elevated temperatures required for forming operations, such as casting, molding, and extruding, the red phosphorus must be of very high quality and/or contain a stabilizer. It has recently been discovered that red phosphorus is also an effective flame retardant additive for polyamides. However, when thus stabilized red phosphorus is added as a flame retardant to polyamides, such as polycaprolactam, the resultant compositions are heat sensitive and the physical properties of the polymer are adversely affected upon exposure to heat aging. This problem is accentuated when copper-containing additives are present, widely used as polyamide stabilizers.

SUMMARY OF THE INVENTION

It is an object of the present invention to provide stabilized red phosphorus.

It is a further object to provide stabilized red phosphorus containing very small amounts of iron and copper impurities.

It is another object to provide flame retardant polyamide compositions containing red phosphorus which are heat stable.

It is still another object to provide flame retardant polyamide compositions containing red phosphorus and copper-containing stabilizers which are heat stable.

Further objects will become apparent from the following detailed description thereof.

It has been discovered that the addition of small amounts of an aminoacetic acid compound of the formula

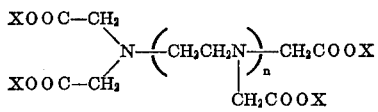

wherein X independently at each occurrence is selected from the group consisting of hydrogen, alkyl or aryl of 1 to 8 carbon atoms and an alkali metal, and $n$ is an integer from 0 to 7, to red phosphorus effectively removes free iron and copper impurities. The stabilized red phosphorus of the invention can be added to polyamides to impart flame retardance without adversely affecting the heat aging properties of the polymer. Alternatively, red phosphorus and an effective amount of the aminoacetic acid compound as described can be added concomitantly to the polyamide, with like results.

DETAILED DESCRIPTION OF THE INVENTION

Suitable aminoacetic acid compounds for use in the invention include nitrilotriacetic acid, ethylenediaminetetraacetic acid, diethylenetriaminepentaacetic acid, tetraethylenepentamineheptaacetic acid and the like; the alkali metal salts of the acids, particularly the sodium, potassium or lithium salts thereof; and esters such as the dimethyl, dibutyl, dibenzyl, diamyl, trimethyl, tributyl, tripentyl, tribenzyl, tetramethyl, tetraethyl, tetra-t-butyl, tetrahexyl, tetrabenzyl, s-dimethyldiethyl, trimethylethyl, methylethyldiisopropyl, and isopropyl-t-butylhexyl esters of ethylenediaminetetraacetic acid and the like.

Ethylenediaminetetraacetic acid and its alkali metal salts are readily available and are preferred in the present invention.

The amount of aminoacetic acid compound to be blended with the red phosphorus is that amount which is effective to remove the iron and copper impurities present. At least a sufficient amount must be added to the red phosphorus to react with or remove these impurities and preferably a slight excess will be added.

The exact method of incorporating the aminoacetic acid compound into the red phosphorus is not critical. Aminoacetic acid compounds can be added to the red phosphorus by washing the red phosphorus with a solution of the aminoacetic acid compound and removing the solvent, or by blending directly. When the red phosphorus is to be added to a polymer, the aminoacetic acid compound and red phosphorus preferably are added to the polymer simultaneously or consecutively in any order and blended directly with the polymer. In this manner the aminoacetic acid compound can remove iron and copper impurities whether introduced into the polymer composition by the red phosphorus or by other additives in the polymer. Red phosphorus can be added to polyamides in amounts of from about 0.5 to about 15% based on the total weight of the composition, to impart flame retardancy to the polyamide. Alternatively, from about 5 to about 25% by weight of the red phosphorus of the aminoacetic acid can be added directly to the polyamide.

The term polyamide as employed herein includes polymers having recurring amide linkages. Illustrative of such polyamides are condensation polymers of dicarboxylic acids and diamines, such as polyhexamethyleneadipamide, polyhexamethylenesebacamide, and the like; polymers of lactams having from 6–12 carbon atoms in the lactam ring such as polycaprolactam, polycapryllactam, polyoenantholactam, polylauryllactam; and mixed polymers such as terpolymers of lactams and ethylene/alkyl acrylate, alkyl methacrylate and vinyl acetate copolymers and the like. As is well known to one skilled in the art, polyamides can also contain heat and light stabilizers, mold lubricants, pigments, fillers, nucleating agents, terminating agents, and the like in effective amounts.

The polyamides containing stabilized red phosphorus according to the invention are useful for the formation of fibers, monofilaments, films and molded articles of improved flame retardance and excellent physical properties.

The invention will be further illustrated by the following examples, but it is to be understood the invention is not meant to be limited to the details described therein. In the examples, al parts and percentages are by weight. Ultimate elongation and ultimate tensile strength are determined according to ASTM test D638–68.

Example 1

Sixty-two parts of commercially available red phosphorus which contained 1.64% ash of which 0.5% was iron and 0.05% was copper, was stirred vigorously with 100 parts of an aqueous solution containing 1% of ethylenediaminetetraacetic acid and 0.5% of sodium hydroxide for twenty minutes. The mixture was filtered, the red phosphorus washed with water and dried at 90° C. under vacuum for 12 hours.

The resultant stabilized red phosphorus contained 1.45% ash which contained less than 0.05% iron and 0.01% copper.

Example 2

Part A (Control): One hundred parts of a glass filled polycaprolactam containing 30% of ⅛" long glass fibers, 0.3% of sodium stearate, 0.6% of talc, stabilized with cupric chloride and potassium iodide such that the final composition contained about 50 p.p.m. of copper and 0.28% of the polycaprolactam of potassium iodide and having an ultimate tensile strength of 23,500 p.s.i. and 3.5% ultimate elongation, was blended with 7 parts of unstabilized red phosphorus as in Example 1 and charged to an extruder at 260° C. The blend was extruded as a monofilament, pelletized and dried, then compression molded into sheets from which tensile specimens were cut.

Ultimate elongation and ultimate tensile strength were measured and the specimens exposed to accelerated heat aging by placing in a circulating air oven at 170° C. for twenty days. Results are tabulated below:

|  | Initial | Final | Retention, percent |
|---|---|---|---|
| Ultimate elongation | 2.0 percent | 0.49 percent | 24.5 |
| Ultimate tensile strength | 10,730 p.s.i | 3,930 p.s.i | 36.6 |

Part B: The procedure of Part A was followed except 0.82 part of nitrilotriacetic acid trisodium salt was added with the red phosphorus. Results are summarized below:

|  | Initial | Final | Retention, percent |
|---|---|---|---|
| Ultimate elongation | 1.8 percent | 0.71 percent | 39.5 |
| Ultimate tensile strength | 10,620 p.s.i | 5,050 p.s.i | 47.5 |

Part C: The procedure of Part A was followed except 1.13 parts of ethylenediaminetetraacetic acid tetrasodium salt was added in place of the nitrilotriacetic acid salt and 0.25 part of ferric chloride was also added. Results are given below:

|  | Initial | Final | Retention, percent |
|---|---|---|---|
| Ultimate elongation | 1.6 percent | 0.86 percent | 53.8 |
| Ultimate tensile strength | 9,420 p.s.i | 4,970 p.s.i | 52.7 |

Part D: As a comparison, the procedure of Part C was followed except omitting the ethylenediaminetetraacetic acid salt. Results are given below:

|  | Initial | Final | Retention, percent |
|---|---|---|---|
| Ultimate elongation | 1.7 percent | 0.55 percent | 32.4 |
| Ultimate tensile strength | 9,710 p.s.i | 3,510 p.s.i | 36.2 |

Part E: As a comparison, the procedure of Part B was followed except omitting the aminoacetic acid salt and substituting 2.06 parts of aluminum hydroxide. Results are given below:

|  | Initial | Final | Retention, percent |
|---|---|---|---|
| Ultimate elongation | 1.5 percent | 0.38 percent | 25.3 |
| Ultimate tensile strength | 9,540 p.s.i | 2,460 p.s.i | 25.9 |

We claim:
1. A flame retardant composition comprising a polyamide having recurring amide linkages as part of the main polymer chain and containing from about 0.5 to about 15% by weight based on the total composition of red phosphorus and an amount of an aminoacetic acid compound of the formula

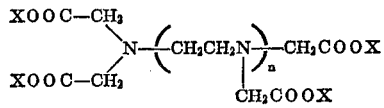

wherein X independently at each occurrence is selected from the group consisting of hydrogen, alkyl or aryl of 1 to 8 carbon atoms and an alkali metal and $n$ is an integer from 0 to 7 effective to remove iron and copper impurities.

2. A composition according to claim 1 wherein from about 5 to about 25% by weight of the red phosphorus of the aminoacetic acid compound is present.

3. A composition according to claim 1 wherein the aminoacetic acid compound is ethylenediaminetetraacetic acid or an alkali metal salt or ester thereof.

4. A composition according to claim 1 wherein the aminoacetic acid compound is ethylenediaminetetraacetic acid tetrasodium salt.

5. A composition according to claim 1 wherein the aminoacetic acid compound is nitrilotriacetic acid trisodium salt.

6. A composition according to claim 1 wherein the polyamide is polycaprolactam.

7. A composition according to claim 6 additionally containing about 30% by weight of the polycaprolactam of glass fibers.

References Cited

UNITED STATES PATENTS

| 3,418,267 | 12/1968 | Busse | 260—33.8 |
| 3,546,160 | 12/1970 | Dany et al. | 260—45.7 |
| 3,663,654 | 5/1972 | Haaf | 260—874 |
| 3,525,708 | 8/1970 | Clark et al. | 260—45.85 |
| 3,663,495 | 5/1972 | Michael et al. | 260—37 |
| 3,577,556 | 5/1971 | Longoria | 260—45.85 |
| 2,558,728 | 7/1951 | Britton et al. | 260—45.85 |
| 2,702,283 | 2/1955 | Wilson et al. | 260—6 |
| 3,020,306 | 2/1962 | Birum | 260—2.5 |
| 3,330,783 | 7/1967 | Piechota et al. | 260—2.5 |

DONALD E. CZAJA, Primary Examiner

R. A. WHITE, Assistant Examiner

U.S. Cl. X.R.

260—45.7 P, 45.85 N